United States Patent [19]

Quang et al.

[11] Patent Number: 4,582,630

[45] Date of Patent: Apr. 15, 1986

[54] PROCESS FOR MANUFACTURING SYNTHESIS GAS, PARTICULARLY USEFUL FOR PRODUCING METHANOL

[75] Inventors: Dang V. Quang, Paris; Claude Raimbault, Bailly; Régis Bonifay, Asnieres; Jean-François Le Page, Rueil-Malmaison, all of France

[73] Assignee: Institut Francais du Petrole, Rueil-Malmaison, France

[21] Appl. No.: 687,231

[22] Filed: Dec. 28, 1984

[30] Foreign Application Priority Data

Dec. 30, 1983 [FR] France ................... 83 21078

[51] Int. Cl.$^4$ ............................................. C01B 3/36
[52] U.S. Cl. ................................... 252/373; 518/703; 518/704
[58] Field of Search ......................... 252/373; 518/703

[56] References Cited

U.S. PATENT DOCUMENTS 2,894,826  7/1959  Stengel ........................... 422/148
4,413,153  11/1983  Garwood et al. ............... 518/703

Primary Examiner—Natalie Trousof
Assistant Examiner—Bruce D. Gray
Attorney, Agent, or Firm—Millen & White

[57] ABSTRACT

A synthesis gas for methanol production, containing hydrogen and carbon oxides, is obtained by performing, separately, a steam-reforming of hydrocarbons and a hydrocarbon combustion step: the effluents are admixed and the resultant mixture is subjected to steam-reforming.

11 Claims, 4 Drawing Figures

PROCESS FOR MANUFACTURING SYNTHESIS GAS, PARTICULARLY USEFUL FOR PRODUCING METHANOL

BACKGROUND OF THE INVENTION

Methanol, known as one of the basic organic chemicals, is essentially manufactured from mixtures of hydrogen with carbon oxides, currently called "synthesis gas", according to the balanced reactions:

$$CO + 2H_2 \rightleftharpoons CH_3OH \quad (1)$$

$$CO_2 + 3H_2 \rightleftharpoons CH_3OH + H_2O \quad (2)$$

Almost all the synthesis gas used for manufacturing methanol is obtained by steam-reforming of natural gas, whose main component is methane and which reacts with water according to the following reactions:

$$CH_4 + H_2O \rightleftharpoons CO + 3H_2 \quad (3)$$

$$CH_4 + 2H_2O \rightleftharpoons CO_2 + 4H_2 \quad (4)$$

Methane homologs, present in minor proportion in natural gas, react similarly accoring to a well-known stoichiometry.

The leading role of natural gas as raw material in methanol synthesis is justified, economically by its large availability and its attractive price, and technically by its ease of use and the high purity of the synthesis gas obtained therefrom.

The use of natural gas suffers however from a disadvantage: the composition of the synthesis gas obtained therefrom is far from being the optimum composition required for methanol synthesis.

As a matter of fact, when considering equations (1) and (2) in comparison with equations (3) and (4), it is apparent that, for each mole of methanol manufactured according to (1) and (2), the reforming gas obtained according to (3) and (4) gives one hydrogen molecule in excess.

Even in the favorable cases where it can be upgraded, said hydrogen is always produced at a cost which exceeds that of hydrogen produced by more suitable methods.

Another disadvantage of the reforming gas is its low pressure as compared to the requirements for methanol synthesis, both for technological and thermodynamic reasons.

As a matter of fact, at constant temperature and $H_2O/C$ ratio, the higher the pressure, the larger the unconverted methane proportion in the synthesis gas (P. Wellman and S. Katell, Hydrocarbon Processing, No 6, vol 42, June 1962).

An increase of the reaction temperature might theoretically increase the methane conversion, but an upper limit is imposed by the metal flow hazards, and it is hence difficult to operate at temperatures higher than 850° C. in reforming tubes.

Similarly, for reasons of power consumption, the $H_2O/C$ ratio cannot be increased beyond 3-4.

With these limitations and in order to avoid an excessive increase of the residual methane content, steam-reforming of natural gas is usually performed at a pressure not exceeding 3 MPa, whereas methanol synthesis usually requires pressures of about 5-12 MPa.

Another method known for producing a synthesis gas is the oxidation of methane by oxygen. From the strictly chemical point of view, the ideal reaction for manufacturing synthesis gas from natural gas is the following:

$$CH_4 + \tfrac{1}{2}O_2 \rightleftharpoons CO + 2H_2 \quad (5)$$

This reacton is currently performed in partial oxidation catalytic processes such as ONIA-GEGI process, for example.

The major disadvantage of these catalytic processes results from their operation at atmospheric pressure.

The compression cost for increasing their pressure to the level required for methanol synthesis makes them economically unsatisfactory.

In the middle of the fifties, attempts were made to operate these catalytic processes under pressure. The results were disappointing since every time the gas was admixed with oxygen under high pressure and at high temperature explosion phenomena and clogging of the catalyst bed by excessive soot formation occurred, thus requiring the termination of the experiments (Du Bois Eastman, Ind. Eng. Chem. vol 48, p. 1118-1122, July 1956).

For this reason, the present partial oxidation processes, such as the Shell process (C. I. Reed and C. J. Kuhrese, Hydrocarbon Processing vol 67 (9), p. 191-194, September 1979) or the Texaco process (W. L. Slater and R. M. Dille, Chem.Eng.Prog. vol 61 (No 11), p. 85-88, November 1965) are all operated under pressure but without catalyst and with $O_2/C$ ratios of at least 0.7 oxygen mole per carbon atom contained in the hydrocarbons.

By these processes, synthesis gas can be obtained under sufficient pressure for direct methanol synthesis, but with the disadvantage of a large carbon monoxide excess in proportion to hydrogen.

Sometimes, the CO in excess may be used to manufacture acetic acid. However the disproportion between the methanol market and that of acetic acid does not permit one to rely on such a favorable CO upgrading.

Also, so-called primary and secondary reforming units can be used wherein air, optionally enriched with oxygen, is introduced at the output of the conventional steam-reforming, into the cracked gas, the resultant effluent being subjected to a so-called secondary catalytic reforming step (D. R. Holland and S. W. Wan, Chem.Eng.Prog. vol 59 (8), p. 69-74, August 1963).

These units cope with the difficulties indicated by Du Bois Eastmann since, as a result of the dilution with nitrogen and of the small percentage of introduced oxygen, the mixture is clearly below the lower explosive limit.

In view of the presence of nitrogen and of the high $H_2/CO$ ratio, these units can only be used to prepare synthesis gas for ammonia.

As a matter of fact, in this type of use, nitrogen, instead of being an expensive inert diluent is, on the contrary, an indispensable raw material.

Recently, by removing nitrogen and increasing the oxygen proportion, it has been proposed (French Pat. No. 2372116) to extend this operating mode to pure oxygen and to the manufacture of gas for synthesis methanol.

As shown in Table I below, the range of explosiveness of carbon monoxide and hydrogen is even larger than that of methane and the proposed improvement does not avoid the difficulties indicated by Texaco Company.

TABLE I

FLAMMABILITY LIMITS OF GASES AND VAPORS IN OXYGEN
(According to Patty)

| | Flammability limits (in vol %) | |
|---|---|---|
| | Lower | Higher |
| Methane $CH_4$ | 5.15 | 60.5 |
| Ethane $C_2H_6$ | 3.05 | 66.0 |
| Hydrogen $H_2$ | 4.65 | 93.9 |
| Carbon monoxide CO | 15.5 | 93.9 |

SUMMARY OF THE INVENTION

The process of the invention avoids the defects of the known processes and makes it possible to produce, under highly safe conditions, a synthesis gas whose composition and pressure are adapted for direct methanol synthesis.

This process comprises the following steps of:

(a) Passing a first hydrocarbon charge, containing at least 50% by moles of methane and admixed with steam, over a steam-reforming catalyst, at a temperature of 600°–1000° C. under so-selected operating conditions as to convert only 50–99.5%, preferably 60–95%, expressed as carbon, of the hydrocarbon charge, and recovering a gas of relatively high hydrogen content, comprising steam and the unconverted portion of the hydrocarbon charge.

(b) Subjecting a second hydrocarbon charge, containing at least 50% by mole of methane, to combustion in contact with an oxygen-containing gas, in the presence of steam, the ratio of the number of oxygen moles to the number of carbon atoms of said second hydrocarbon charge being from 0.55:1 to 2:1, said combustion increasing the gas temperature to 1200°–2500° C., and recovering a combustion gas of relatively high carbon oxides content.

(c) Admixing the gas obtained from step (a) with the gas obtained from step (b), circulating the resultant mixture through a steam-reforming zone, and recovering the formed synthesis gas.

In the above process, the gas obtained from step (a) has a relatively excessive hydrogen content with respect to the stoichiometrical proportion required for methanol synthesis whereas the gas obtained from step (b) contains an excess of carbon oxides (CO and/or $CO_2$), with respect to said stoichiometry. Step (c) provides for the complete conversion of hydrocarbons so as to obtain a ratio close to the stoichiometry required for methanol synthesis. The heat required for step (c) is supplied by the sensible heat of gases from step (b). By convenient adjustment of the respective proportions of hydrocarbons, oxygen and steam fed to the different steps of the process, it is possible to obtain a gas having the required stoichiometry for methanol synthesis.

The hydrocarbon charge is preferably natural gas.

The hydrocarbon charges in steps (a) and (b) may be two fractions of the same hydrocarbon charge, for example of natural gas.

In step (b), the oxygen-containing gas has preferably a high oxygen content, for example 90–100% by volume.

The whole process may be operated under a pressure of 1–20 MPa, preferably 3–12 MPa.

The gas flow rates in steps (a) and (b) are maintained in a proportion substantially equivalent to that defined by equation (5), i.e. with a ratio of oxygen moles/carbon atoms in the gas from 0.2 to 0.7, preferably 0.25–0.5.

BRIEF DESCRIPTION OF THE DRAWINGS

The invention will be further illustrated by the accompanying drawings wherein.

Figure 1:
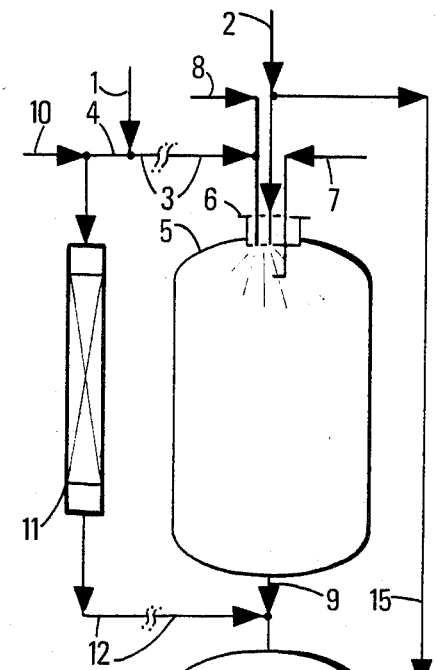
FIG. 1 is a diagrammatic view of a first embodiment of apparatus for performing the process of the invention, wherein the reactor for the conversion of residual methane is shown as an enclosure separate from the combustion chamber.

Natural gas, supplied through line (1) is distributed to lines (3) and (4). Oxygen is introduced through line (2).

Lines (2) and (3) open into the controlled combustion chamber (5) equipped with a burner (6).

The burner (6) is provided with separate inlet channels for natural gas and oxygen whose streams meet only at the location of a bright flame, maintained permanently, if necessary, by means of a pilot igniter (7).

The combustion chamber or oxidation reactor (5) is selected of such a size that, at the output thereof, free oxygen will have substantially disappeared by combination with hydrogen and carbon to form CO, $CO_2$ and $H_2O$.

The residence time of the gases in the combustion zone (5) is advantageously from one thousandth of second to one hundred seconds, preferably from one hundredth second to sixty seconds.

Everything else being unchanged, the residence time depends on the flame temperature: with a hotter flame, the residence time may be shorter and the volume of the combusion chamber (5) may be reduced.

The indicated residence time is a conventional time, i.e. the gas flow rates are expressed in standard conditions, under atmospheric pressure and at 0° C.

The temperature of the combustion chamber (5) may be adjusted by addition of steam fed through line (8). It is usually from 1200° to 2500° C., preferably 1300°–1700° C.

The burned gases are discharged through line (9).

The natural gas remaining portion, conveyed through line (4), is admixed with steam supplied through line (10) and the mixture is fed to the reforming reactor (11) operating within the same pressure range as the oxidation reactor (5).

The ratio of water moles from line (10) to carbon atoms from line (4) is adjusted within the range of 1:1 to 100:1, preferably of 1.5:1 to 10:1.

The temperature is usually 600°–1000° C., preferably 700°–900° C. The operating conditions, for example the temperature and/or the residence time, are so adjusted as to convert only a part of methane. The residual methane content ranges, for example, from 0.5 to 50%, preferably 5–40% of the gas, expressed as dry gas.

This residual content is very important since it determines the final purity of the synthesis gas.

The reformed gases flow out through line (12) and are fed to enclosure (13) where they are adiabatically mixed with the combustion gas supplied through line (9), and their residual methane content is completely converted to a CO/H$_2$ mixture.

The reactions in enclosure (13) may be of a purely thermal nature. In order to reduce the bulk of the enclosure, it is however possible to provide it with a catalyst, the use of a catalyst being made possible by the small soot content of the effluent from the preceding combustion reactor.

The temperature in enclosure (13) is about 800°–1200° C.

The resultant synthesis gas, useful for methanol production, is discharged through line (14).

For clarity, in the diagram, enclosures (5) and (13) are shown separately in FIG. 1.

For reasons of mechanical convenience, these enclosures may also be arranged in a single metallic shell, as two compartments communicating with each other.

Figure 2:
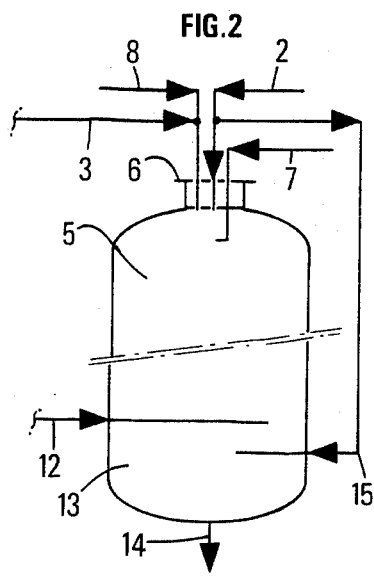
FIG. 2 illustrates a second embodiment, wherein the conversion of residual methane is performed in a zone adjacent to the combustion zone, in a common enclosure.
Figure 3:
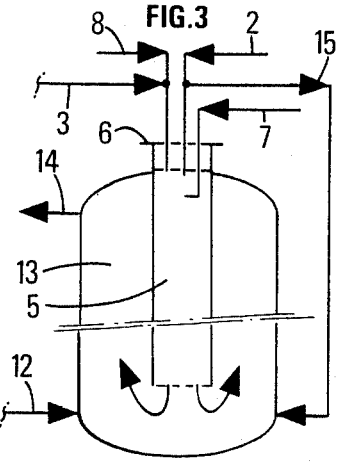
FIG. 3 illustrates a third embodiment wherein, in a single enclosure, the residual methane conversion zone and the combustion zone are concentric.

The thickness of the casing, generally formed of a metal wall lined inside with one or more refractory layers, being dependent on the temperature of the gases fed thereto, another alternative embodiment will consist of arranging the enclosures (5) and (13) in superposed or concentric positions (FIGS. 2 and 3 respectively).

Then, the combustion heat from zone (5) will propagate by conduction and radiation towards zone (13).

Figure 4:
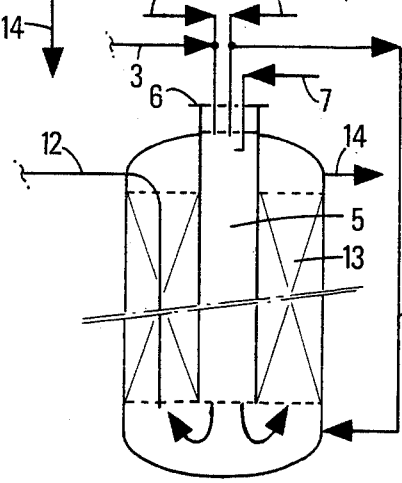
FIG. 4 illustrates a further embodiment wherein the residual methane conversion zone is fed with reformed gases through a bundle of tubes embedded in the catalyst bed of said zone.

Another improvement (FIG. 4) consists of extending line (12) by a bundle of tubes embedded in the catalyst bed and provided for decreasing, by heat exchange, the radiation temperature of said bed.

As shown in example 1, the temperature in enclosure (5) may be very high, depending on the selected O$_2$/C ratio.

In order to avoid excessive heat evoluion, a portion of oxygen (2) may be diverted through line (15) to enclosure (13) (example IV). Of course, this oxygen supply through line (15) must remain outside the explosive limits.

An essential condition for the good operation of the process according to the invention is to limit said diversion to such a value that the oxygen content of the mixture of streams from lines (9), (12) and (15) be always lower than the value L (lower explosive limit of the mixture) obtained by applying the Le Chatelier law, in accordance with formula (6) below.

$$L = \frac{100}{\frac{P_{H2}}{N_{H2}} + \frac{P_{CO}}{N_{CO}} + \frac{P_{CH4}}{N_{CH4}}} \quad (6)$$

$P_{H2}$, $P_{CO}$ and $P_{CH4}$ being the respective molar proportions of H$_2$, CO and CH$_4$ at the inlet of enclosure (13), so calculated that:

$$P_{H2} + P_{CO} + P_{CH4} = 100$$

$N_{H2}$, $N_{CO}$, $N_{CH4}$ being the respective lower explosive limits of hydrogen, carbon monoxide and methane.

EXAMPLES

The following non limitative examples illustrate the process of the invention:

EXAMPLE 1

The operation is conducted in accordance with diagram of FIG. 1, under a pressure of about 5 MPa.

3400 kmoles/h of natural gas and 1320 kmoles/h of substantially pure oxygen are used.

The gases are respectively introduced through lines (1) and (2). Natural gas is at 350° C. and has the following composition:

| | |
|---|---|
| CO$_2$ | 1.8% by volume |
| CH$_4$ | 82.65% by volume |
| C$_2$H$_6$ | 13.95% by volume |
| C$_3$H$_8$ | 1.6% by volume |
| Inerts | insignificant |
| | 100.00% |

1200 kmoles/h of natural gas are diverted through line (3) and 800 kmoles/h of steam, superheated at 300° C., are added thereto through line (8). Methane (3) and oxygen (2) burn in contact with pilot flame (7).

The ratio of the number of oxygen moles to the number of carbon atoms is 0.94. The corresponding ratio, when excluding the CO$_2$ already contained in the initial gas, is 0.954.

The output gases from the controlled combustion chamber (5) are at a temperature of about 2250° C. and have the following average composition (% by volume):

| | |
|---|---|
| CO | 25.7% |
| CO$_2$ | 3.8% |
| H$_2$ | 30.8% |
| CH$_4$ | traces |
| H$_2$O | 39.7% |
| Inerts | traces |
| | 100.0% |

The remaining natural gas, i.e. 2200 kmoles/h is supplied through line (4) to tubes (11) filled with nickel catalyst.

Tubes (11) are externally heated by natural gas burners, not shown in FIG. 1. Superheated steam is simultaneously supplied at a rate of about 7 100 kmoles/h to tubes (11) through line (10), so as to facilitate partial cracking of hydrocarbons and to avoid coke deposits.

Reformed gases from tubes (11) enter line (12) at a temperature of about 800° C. They have approximately the following composition:

| | |
|---|---|
| CO | 5.3% |
| CO$_2$ | 6.4% |
| H$_2$ | 37.0% |
| CH$_4$ | 9.7% |
| H$_2$O | 41.6% |
| Inerts | traces |
| | 100.0% |

Gases from lines (9) and (12) pass to enclosure (13). Enclosure (13) operates without catalyst, under substantially adiabatic conditions, at about 970° C.

At the output, the gases, expressed as dry gases, have, as an average, the following composition by volume:

| | |
|---|---|
| CO | 20.2% |
| CO$_2$ | 8.8% |
| H$_2$ | 68.1% |

| | |
|---|---|
| CH₄ | 2.9% |
| | 100.0% |

It is observed that the molar ratio $H_2/(2CO+3CO_2)$ is 1.02, said value being practically ideal for methanol synthesis, as defined by equations (3) and (4).

EXAMPLE II

The operation is conducted as in example I, except that, in this run, only 594 kmoles of natural gas are diverted to the combustion chamber (5).

The temperature is maintained at 1500° C. by addition of 8700 kmoles/h of steam. The ratio of oxygen moles/carbon atoms is close to 2.

The mixture obtained at the combustion output (9) consists exclusively of water and $CO_2$, without soot.

The reamining natural gas (2806 kmoles/h) is fed to reforming tubes (11), together with steam, in a molar ratio $H_2O/C$ of substantially 2.5:1.

The reforming output temperature (12) is adjusted at 800° C. and the gas composition is approximately the following:

| | |
|---|---|
| CO | 5.6% |
| CO₂ | 6.4% |
| H₂ | 37.3% |
| CH₄ | 11.0% |
| H₂O | 39.7% |
| | 100.0% |

The two gas streams (9 and 12) are fed to enclosure (13) which now contains nickel catalyst on refractory carrier.

After adiabatic cracking, a mixture is obtained whose composition under dry conditions is the following:

| | |
|---|---|
| CO | 12.0% |
| CO₂ | 15.0% |
| H₂ | 70.1% |
| CH₄ | 2.9% |
| | 100.0% |

The temperature of the catalyst bed is 870° C. and it is observed that the molar ratio $H_2/(2CO+3CO_2)$ is 1.016.

The total steam amount used in this run is about 17000 kmoles/h, as compared to 8000 kmoles/h, used in example I.

EXAMPLE III

The operating conditions are the same as in example I, except that, in this run, 1600 kmoles per hour of natural gas are diverted to the combustion chamber (5). ($O_2/C=0.7$ by moles, instead of 0.95 in example I).

The gases discharged from chamber (5), at about 1550° C., have the following composition in percent by volume:

| | |
|---|---|
| CO | 27.1 |
| CO₂ | 3.2 |
| H₂ | 45.1 |
| H₂O | 24.6 |
| CH₄ and inerts | traces |
| | 100.0 |

The reforming tubes (11) are operated with 1800 kmoles/h of natural gas and 9150 kmoles/h of steam and produce, at 800° C., a gas having the following composition:

| | |
|---|---|
| CO | 4.1% |
| CO₂ | 6.3% |
| H₂ | 34.4% |
| CH₄ | 4.9% |
| H₂O | 50.3% |
| | 100.0% |

The resultant gases are conveyed to enclosure (13) which again contains no catalyst.

After cracking, the mixture is at temperature of about 930° C. Once dried and cooled, the gas has the following average composition:

| | |
|---|---|
| CO | 17.5% |
| CO₂ | 10.9% |
| H₂ | 68.6% |
| CH₄ | 3.0% |
| | 100.0% |

The ratio $H_2/(2CO+3CO_2)$ is here 1.004.

EXAMPLE IV

Gas flow rates to tubes (11) and chamber (5) are the same as in example I, but 330 kmoles/h of oxygen are diverted through line (15) to enclosure (13).

At the output, the gas composition is substantially the same as in example I, but the temperature inside combustion chamber (5) is only about 1550° C.

It is observed that, at the imput of enclosure (13), the oxygen content of the gas is only 2% by volume, a value which is substantially below the explosive limit of 5.5% given by formula (6).

What is claimed as the invention is:

1. A process for manufacturing a synthesis gas of a composition suitable for methanol synthesis, characterized by the following steps, operated under a pressure of 1–20 MPa, comprising:
    (a) contacting with a steam-reforming catalyst, in a first reaction zone, a first hydrocarbon charge containing at least 50% by moles of methane and admixed with steam, the operating conditions being so selected as to convert only 50–99.5%, calculated as carbon, of the hydrocarbon charge, and recovering a gas of relatively high hydrogen content and containing the unconverted portion of the hydrocarbon charge;
    (b) subjecting, in a second reaction zone separate from that of step (a), a second hydrocarbon charge containing at least 50% by moles of methane, to combustion in contact with an oxygen-containing gas, the ratio of the number of oxygen moles to the number of carbon atoms of said second charge being from 0.55:1 to 2:1, and recovering a combustion gas of relatively high carbon oxide content, at a temperature of 1200°–2500° C.;
    (c) admixing the gas obtained in step (a) with the gas obtained in step (b), circulating the resultant mixture through a steam-reforming zone, and recovering the formed synthesis gas;
    (d) said process being further characterized in that the ratio of the total oxygen amount involved to the total hydrocarbons amount involved, expressed as oxygen moles/carbon atoms is from 0.2:1 to 0.7:1.

2. A process according to claim 1, wherein the conversion of the hydrocarbon charge in step (a) is 60-95%.

3. A process according to claim 1, wherein the hydrocarbon charge in steps (a) and (b) are two fractions of the same initial charge.

4. A process according to claim 1, wherein step (c) is catalytic.

5. A process according to claim 1, wherein step (c) is thermal.

6. A process according to claim 1, wherein, in step (b), the residence time in the combustion zone is 0.001-100 seconds and the oxygen-containing gas has a 90-100% by volume oxygen content.

7. A process according to claim 1, wherein the temperatures are respectively 600°-1000° C. for step (a), 1300°-1700° C. for step (b) and 800°-1200° C. for step (c).

8. A process according to claim 1 wherein the temperature of step (c) is obtained by an adiabatic mixture of the gases obtained in step (a) and in step (b).

9. A process according to claim 1, wherein the molar ratio of water to hydrocarbons expressed as carbon, is from 1.5:1 to 10:1 in step (a).

10. A process according to claim 1, wherein step (a) is performed with a nickel catalyst.

11. A process according to claim 1, wherein the admixing of the gas obtained in step (a) with the gas obtained in step (b) is conducted with the addition of a controlled oxygen amount so that the oxygen content of the resultant mixture is lower than the lower explosion limit for the mixture.

* * * * *